United States Patent Office 2,701,810
Patented Feb. 8, 1955

2,701,810

REFINING OF GLYCERIDE PRESS STEAMINGS

Maurice M. Durkee, Decatur, Ill., assignor to A. E. Staley Manufacturing Company, Decatur, Ill., a corporation of Delaware No Drawing. Application April 30, 1951,
Serial No. 223,837

5 Claims. (Cl. 260—425)

This invention relates to the recovery of glyceride refinery wastes, and especially to the refining of press steamings.

In the refining of glyceride oils and fats, one of the major steps is bleaching with color adsorbent materials such as activated carbon and bleaching earths. These are thoroughly mixed with the oil and the mixture then passed through a filter press to remove the finely divided adsorbent materials. The adsorbents retain a considerable proportion of oil and it is important that this oil be recovered, in order to minimize losses in the refining process.

Similar problems develop whenever the oil is filtered, at any stage in the refining process, to remove solids. For example, in the winterizing step a filtering aid is used and it is desirable to recover the oil from the oil-soaked press cake. A common method of recovering this oil is to blow steam and/or air through the press until the oil is substantially displaced. This displaced oil is generally known in the industry as "press steamings."

This recovered oil is normally kept separate from the main body of oil, since the press steaming oil is of lower quality. This lower quality may be due to the effect of the steam and/or air on the oil in the presence of the adsorbents and filter-aids and/or some of the impurities removed by the solids may be liberated by the steaming treatment and re-introduced into the oil, perhaps associated with chemical modifications of the impurities themselves. There appears to be some oxidation, hydrolysis and polymerization involved, and the products of these reactions must be removed to make the oil usable.

The processing of these press steamings has always been a troublesome operation in the oil refinery. Although many methods have been tried, they all are characterized by such disadvantages as emulsion problems, excessive oil losses and poor oil quality.

A principal object of this invention is to provide an improved process for the refining of press steamings.

It has been unexpectedly discovered that press steamings can be refined with sodium silicate as the sole refining agent, yielding high quality oil with greatly reduced refining losses. This oil has very satisfactory color and flavor characteristics and is entirely suitable for blending with the main body of the oil from which the press steamings are derived.

Sodium silicate has previously been used in the refining of glycerides, but so far as is known it was always used in combination with other refining agents, such as hydroxide and/or carbonates of the alkali metals. Such processes are revealed in U. S. Patents Nos. 637,131; 1,007,642; 1,056,262 and 1,056,264. The instant discovery that press steamings can be efficiently purified by the use of silicate alone is an invention possessing novelty and utility.

The general process utilizing this invention will now be outlined. A weighed quantity of press steamings is introduced into a tank equipped with suitable heating and stirring devices. While stirring vigorously, a weighed amount of sodium silicate solution is introduced, whereupon the stirring rate is decreased and the mixture heated moderately until a "break" is obtained. The heating and agitation are then discontinued and the mixture allowed to stand until it separates into two layers. The upper layer of oil is then removed, washed and the washings separated from the oil. The lower, aqueous layer is processed to recover fatty substances contained therein.

The silicate used is, for obvious economic reasons, the sodium silicate commercially available, although other soluble alkali silicates could of course be used. The sodium silicate solution may vary in concentration and in the proportion of $Na_2O$ to $SiO_2$ present. A very satisfactory sodium silicate solution is one of about 41° Baumé, in which the ratio of $Na_2O$ to $SiO_2$ is about 1:3.2, with a silicate solids content of about 38%, although these values are not critical and can be varied appreciably without deleterious effects. Such silicate solutions may be used without diluting, if the steamings are appreciably wet. If they are relatively dry, the silicate may satisfactorily be diluted with from one to three parts of water before mixing with the oil. It is preferable to have some water present in addition to that present in the commercial sodium silicate solution.

The amount of silicate to use in the refining may be determined either on the basis of the weight of oil used or on the amount of free fatty acids (FFA) present in the press steamings. Based on the weight of the oil being treated, the percentage of silicate used has ranged from 0.75% to 3.5%, the preferred amount ordinarily being about 2 to 3%, depending upon the character of the press steamings with respect to FFA and water content. On the basis of the FFA content, the proportion of silicate used has ranged from one to one up to as much as seven parts of silicate to one part of FFA. The usual ratio is a proportion intermediate between these two extremes, or about three to one.

The oil-silicate mixture is vigorously agitated initially to insure thorough mixing. The mixture is heated to a temperature of preferably about 155° F., although satisfactory results have been obtained throughout the range of about 140° to 170° F. The heating period depends upon the heating rate and the temperature attained, but ranges from about one-half hour to about two hours and is ordinarily about one and one-fourth hours for a temperature of 155° F.

The process is illustrated by the following examples:

Example 1

A quantity of soybean oil steamings weighing 48,350 lbs., containing 0.49% FFA, was introduced into a tank and vigorously agitated during the introduction of a sodium silicate solution made up by adding 725 lbs. of water to 967 lbs. of commercial silicate solution (41.1 Baumé, $Na_2O:SiO_2$ ratio 1:3.22, 37.6% silicate solids). The weight of silicate represents 2% of the oil weight and about four times the amount of FFA present. The rate of agitation was then reduced to avoid emulsification and the mixture heated to about 146° F., whereupon a "break" developed. This heating took about 75 minutes. The heating and agitation was then discontinued and the mixture allowed to stand for about 24 hours. A good separation into two layers resulted. The upper layer of oil was drawn off, washed and deodorized, yielding a refined oil of satisfactory color and flavor characteristics. The lower aqueous layer was worked up to recover the soap stock. The refining loss was 1.24%, which is far below that normally obtained, as by the use of caustic soda solution.

Example 2

A quantity of soybean oil press steamings weighing 38,690 lbs., containing 1.74% FFA, was treated similarly to that in Example 1. This time 1354 lbs. of silicate was added, but no water was used since the steamings were quite wet. This silicate represents 3.5% of the weight of the oil and twice the amount of FFA present in the oil. The mixture was heated to 152° F. during a heating period of 45 minutes, whereupon a good "break" was obtained. The refining loss was 0.66% and a good quality oil was obtained.

Example 3

A quantity of soybean oil press steamings weighing 47,830 lbs., containing 0.55% FFA, was treated as in the above examples. The silicate used weighed 622 lbs.

and before adding was diluted with 1244 lbs. of water. This amount of silicate represents 1.3% of the oil weight and about 2½ times the weight of FFA present in the oil. The mixture was heated to about 167° F. during a period of about 1 hour and 40 minutes. The refining loss was 0.25% and the oil obtained was of an entirely satisfactory quality.

This process is not limited to the refining of soybean oil press steamings. For example, the process has been successfully applied to the refining of corn oil press steamings. Since the alkali refining losses on corn oil steamings are not as high as with soybean oil steamings, the relative amount of reduction in refining loss is less, but the silicate method is nevertheless superior to the conventional alkali refining of this type of recovered oil. The process is also useful in the case of the more unsaturated oils, such as linseed and tung oils. This is probably due to a more extensive modification of these oils resulting from the action of the steam and/or air when the presses are blown out. These more unsaturated glycerides are apparently more unstable under such conditions, yielding more impurities by chemical reaction with the steam and/or air.

That which is claimed as new is:

1. The process of refining glyceride oil press steamings recovered as a residue from refinery presses, consisting of treating the press steamings with aqueous sodium silicate solution as the sole refining agent and separating and recovering the refined oil.

2. The process of refining soybean oil press steamings recovered as a residue from refinery presses, consisting of treating the press steamings with aqueous sodium silicate solution as the sole refining agent and separating and recovering the refined oil.

3. The process of refining glyceride oil press steamings recovered as a residue from refinery presses, consisting of heating and agitating the press steamings with aqueous sodium silicate solution as the sole refining agent until a "break" is obtained and separating and recovering the refined oil.

4. The process of refining glyceride oil press steamings recovered as a residue from refinery presses, consisting of heating to a temperature within the range of about 140° to 170° F. and agitating the press steamings with aqueous sodium silicate solution as the sole refining agent until a "break" is obtained and separating and recovering the refined oil.

5. The process of refining soybean oil press steamings which comprises intimately admixing with soybean oil press steamings from 0.75% to 3.5% by weight of the oil of sodium silicate solution as the sole refining agent and heating the mixture to a temperature of about 140° to 170° F. until a "break" is obtained, and separating and recovering the refined oil.

References Cited in the file of this patent

UNITED STATES PATENTS

| | | |
|---|---|---|
| 637,131 | Klemont et al. | Nov. 14, 1899 |
| 1,007,642 | Chisholm | Oct. 31, 1911 |
| 2,512,245 | Fash | June 20, 1950 |

FOREIGN PATENTS

| | | |
|---|---|---|
| 22,085 | Great Britain | 1903 |